Patented June 14, 1932

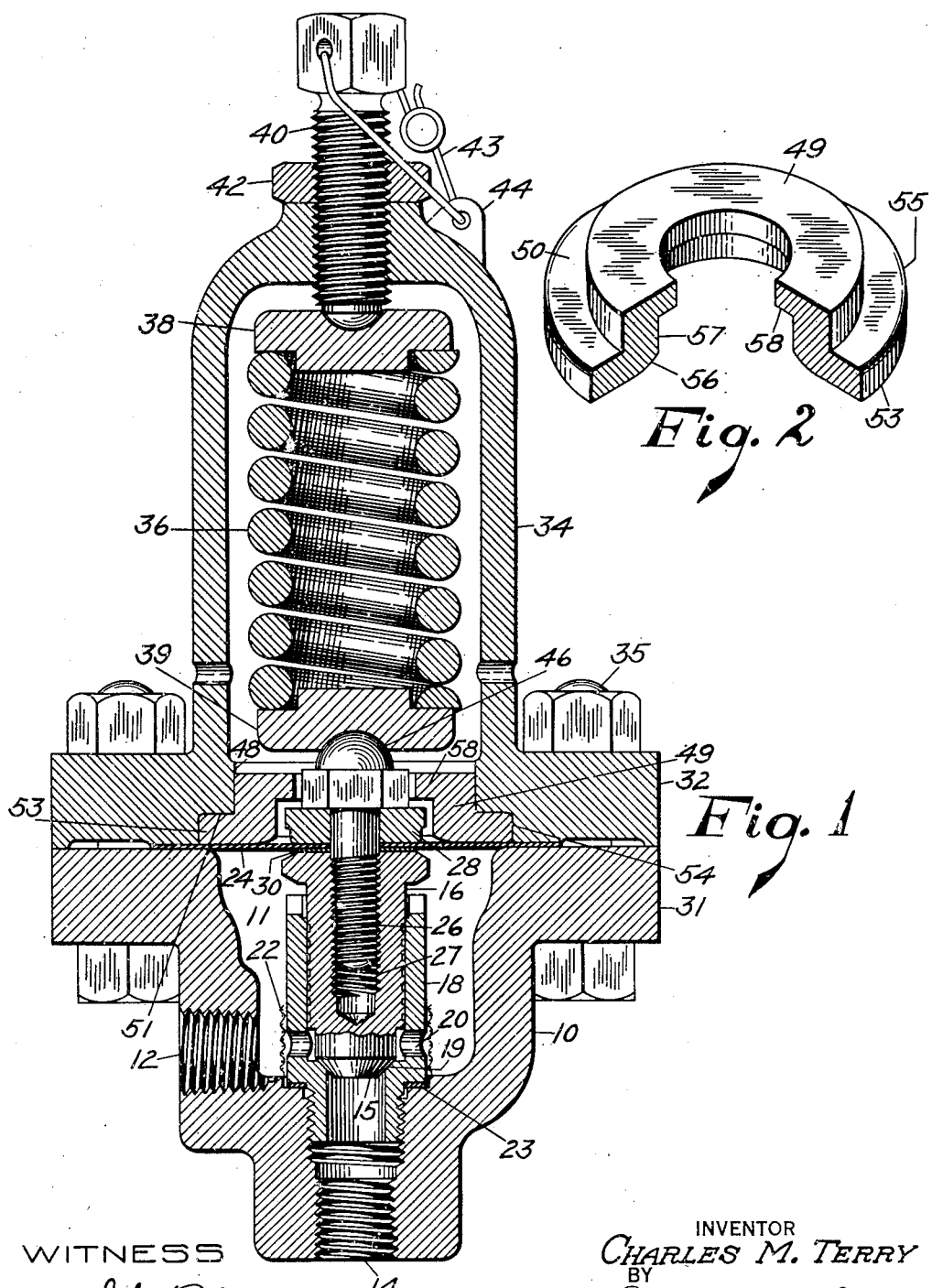

1,863,075

UNITED STATES PATENT OFFICE

CHARLES M. TERRY, OF DECATUR, ILLINOIS, ASSIGNOR TO A. W. CASH COMPANY, OF DECATUR, ILLINOIS, A CORPORATION OF DELAWARE

VALVE

Application filed June 30, 1930. Serial No. 464,898.

This invention relates to valves, and more particularly to valves of the type which utilize spring loaded diaphragms subjected to fluid pressure and arranged to move in response to variations in the pressure.

When such valves are used for high fluid pressures it has been found necessary to provide a diaphragm having a comparatively small effective area, that is, the diaphragm should have only a small area which is unsupported against the pressure of the fluid. Furthermore, high pressure valves necessitate the use of large heavy springs to balance the force exerted against the diaphragm by the fluid. In the attempt to meet these two requirements in the past, designers have considered it necessary to split the casing forming the chamber within which the spring is mounted in order to permit assembly of the various parts, since the opening through the diaphragm support is too small to permit insertion of the spring therethrough. Such a split spring casing is unsightly, expensive to manufacture, and structurally weak.

It is accordingly the main object of my invention to provide a valve having a spring loaded diaphragm which is suitable for use with high fluid pressures and which is so arranged that its various parts may be assembled conveniently without requiring the use of a split spring casing.

It is a further object of my invention to provide a valve construction having an effective diaphragm area which may be altered to meet different fluid pressure conditions by merely changing one comparatively small and inexpensive part.

With this and other objects in view, as will be clear to those skilled in the art, my invention resides in the combination of parts set forth in the specification and covered by the claim appended hereto.

In accordance with my invention I provide a valve having a valve casing provided with a flexible diaphragm subjected to high fluid pressure on one side thereof. This diaphragm is connected to a valve member which serves to control the flow of fluid. A replaceable diaphragm ring provided with a small opening serves to support the diaphragm against the fluid pressure and to limit its effective area to a small size. A compression spring is connected to the diaphragm through the opening in the ring and serves to counteract the fluid pressure. The spring is formed of large diameter wire coiled into a helix having an external diameter greater than the opening in the diaphragm ring, and it is held in position by a spring casing which is separable from and suitably fastened to the valve casing.

Referring to the drawing illustrating one embodiment of my invention and in which like reference numerals indicate like parts, Fig. 1 is a cross section through the center of a relief valve constructed in accordance with my invention; and Fig. 2 is a perspective view of the diaphragm ring, a portion thereof being cut away for clearness of illustration.

For purposes of illustration I have shown the invention as applied to a relief valve, which is arranged to open only when the fluid pressure at the inlet side thereof exceeds a predetermined amount. It will be clear however from the following description that the invention is not limited to valves of this specific type, but is applicable to any valve which utilizes a spring loaded diaphragm.

The embodiment illustrated comprises a hollow open ended valve casing or body 10 shaped to provide a cylindrical chamber 11. A screw threaded inlet opening 12 in one side of the casing leads to the chamber 11, and a screw threaded outlet opening 14 is provided at the lower end of the casing. Fluid flow through the outlet 14 is controlled by a valve member 15 shaped as a frustum of a cone coaxial with the outlet. This valve member is formed on the lower end of a cylindrical piston 16 which is slidable vertically in a hollow cylinder or sleeve 18. The sleeve 18 provides a seat 19 for the valve member 15, and has ports or openings 20 in its walls through which the fluid may flow into the space beneath the piston 16 and above the valve seat. A cylindrical wire mesh screen 22 surrounds these ports 20 and prevents the entrance of dirt or other foreign particles. The sleeve 18 is preferably made separate from the casing 10 and screw threaded thereto as illustrated, an annular gasket 23 being placed between these parts to prevent leakage of fluid.

The movements of the valve member 15 are controlled by the fluid pressure in the chamber 11, the arrangement being such that if the pressure exceeds a predetermined amount the valve will move upwardly, thus opening the outlet passage 14 and relieving the pressure in the chamber. In order to obtain this result I provide a thin flexible diaphragm 24 mounted above the chamber 11 to form the upper wall thereof, and exposed on its lower side to the fluid pressure. This diaphragm is fastened to the valve piston 16 by a hexagon headed screw 26 which extends downwardly into an internally threaded opening 27 in the piston. An annular pressure plate 28 is preferably provided between the head of the screw and the diaphragm, and an annular gasket 30 is mounted between the diaphragm and the upper face of the piston to prevent leakage. The outer edge of the diaphragm is clamped between an annular flange 31 integral with the upper portion of the casing 10 and a similar flange 32 integral with the lower portion of a hollow cylindrical member or casing 34. These flanges are held firmly together by bolts 35.

The casing 34 is shaped to provide a chamber to enclose a heavy coil compression spring 36 which supplies the force necessary to counteract the tendency of the fluid pressure in chamber 11 to move the diaphragm upwardly. I preferably provide a flat disk shaped spring button 38 at the upper end of the spring 36, and a similar button 39 at the lower end of the spring. Button 38 has a depression in its upper surface which fits against the lower semi-spherical end of a screw 40 threaded through the upper portion of the spring casing 34. This screw 40 affords a means for adjusting the pressure of the spring. A lock nut 42 serves to hold the screw in place and prevent accidental turning thereof. Unauthorized tampering with the adjustment is discouraged by the use of a sealed wire 43 extending through openings in the head of screw 40 and a lug 44 integral with the spring casing. The lower spring button 39 has a depression in its lower surface which fits against a semi-spherical protuberance 46 on the head of screw 26. By this construction the pressure of the spring is transmitted to the diaphragm and the valve, and tends to move the diaphragm in opposition to the fluid pressure and to hold the valve closed tightly against its seat.

The lower end of the spring casing 34 is provided with a circular opening 48 which has a diameter sufficiently large to permit the spring and spring buttons to be inserted therethrough at assembly. This avoids the necessity of splitting the spring casing. However, for satisfactory operation at high pressures, the effective area of the diaphragm must be made considerably less than the area of this opening. I obtain the desired effective area by providing a ring shaped member 49 which has the proper external size and shape to fit the opening 48. The ring 49 is preferably formed with a shoulder 50 arranged to fit against a corresponding shoulder 51 on the spring casing. The shoulder 50 may be provided by an outwardly extending flange 53 integral with the ring, and the shoulder 51 may be provided by counterboring the opening 34 as shown in Figure 1 at 54. By slightly rounding the upper outside corner 55 of the flange 53, I avoid the necessity for machining a sharp internal corner in the counterbore 54. The depth of the counterbore is preferably equal to the thickness of the flange 53, and the lower face of the flange is flush with that of the ring, so as to present a smooth continuous surface to contact with the diaphragm 24 and support it against the fluid pressure in the chamber 11. The lower surface of the ring may be curved upwardly at 56 toward the central opening 57, thus avoiding any sharp corners over which the diaphragm would tend to bend abruptly under the influence of the pressure. The ring 49 supports an annular portion of the diaphragm against the fluid pressure and thus determines its effective area. The ring has its central opening smaller than the upper end of the chamber 11, and is so arranged that its under surface projects partly over this opening and so forms a support against which the diaphragm is pressed by the fluid pressure. The size of this under surface therefore determines the effective area of the diaphragm because it holds the outer portion of the diaphragm immovable. Only that part of the diaphragm which lies within the opening of the ring can move.

It is desirable to provide means for limiting the upward movement of the diaphragm, and for this purpose I preferably form an inwardly extending flange 58 integral with the ring 49 at the upper edge thereof. The complete diaphragm ring is therefore Z-shaped in section. The flange 58 overlies the pressure plate 28, which will contact with the flange after a predetermined upward movement. The flange thus serves as a positive stop to prevent excessive movement and possible rupture of the diaphragm under extreme pressures.

The operation of the invention will now be apparent from the above disclosure. The inlet opening 12 is connected to a fluid pressure system, and the outlet 14 is connected to a drain or other suitable place for the discharge of fluid which may flow through the valve. Under normal conditions the valve member 15 is held firmly against its seat 19 by the force of spring 36. If the pressure in chamber 11 exceeds a predetermined amount, it will move the diaphragm 24 in opposition to spring 36, thus raising valve 15 and allowing fluid to flow through openings 20 and outlet 14. The valve will close automatically as soon as the pressure in the chamber 11 has been sufficiently reduced.

The spring casing 34 is formed of one integral piece, so that it presents a sightly appearance externally and is structurally strong to withstand the force of the heavy spring necessary with the high fluid pressures for which the invention is particularly adapted. The effective unsupported area of the diaphragm 24 is determined by the dimensions of the diaphragm ring 49, and this area can be made as small as desired without interfering with the assembly of the various parts, since the spring 36 can be inserted through the opening 48. This spring can be constructed of a large diameter wire coiled into a helix having an external diameter greater than the diameter of the opening in the diaphragm ring, and may thus provide the great spring force necessary in a high pressure valve. The construction is particularly desirable from a manufacturing point of view, since the diaphragm ring is the only part which need be changed to vary the effective area of the diaphragm and thus adapt the valve to a different pressure. The other parts can therefore be manufactured economically on a quantity production basis.

Having thus described my invention, what I claim as new and desire to secure by Letters Patent is:

A high pressure valve comprising a hollow open ended valve casing provided with an inlet and an outlet, a movable valve member mounted in the casing and arranged to control the flow of fluid between the inlet and the outlet, a flat flexible diaphragm mounted over the open end of the casing and connected to the valve to actuate the same, the diaphragm being exposed on one side to the fluid pressure within the casing, a replaceable diaphragm ring in contact with the opposite side of the diaphragm and having a small central circular opening therethrough, said ring serving to support the diaphragm against the fluid pressure and to limit the effective unsupported area of the diaphragm to a small size as predetermined by the high pressure conditions within the valve casing, a heavy compression spring connected to the diaphragm through the opening in the ring and tending to move the diaphragm in opposition to the fluid pressure, said spring being formed of large diameter wire coiled into a helix having an external diameter greater than the diameter of the opening and providing when compressed a sufficient force to counteract the fluid pressure on the effective diaphragm area, a spring casing arranged to enclose the spring and hold it in a compressed condition, said valve casing and spring casing being shaped to hold the diaphragm ring and diaphragm clamped therebetween and the spring casing being closed at the end opposite the diaphragm, and means for removably securing the casings together, the diaphragm ring being separable from the spring casing to permit insertion of the spring therein at assembly.

Signed at Decatur, Illinois, this 25th day of June, 1930.

CHARLES M. TERRY.